Dec. 15, 1970   C. M. T. WESTELAKEN ET AL   3,547,612
PRODUCTION OF GRANULAR FERTILIZERS
Filed Feb. 21, 1966   3 Sheets-Sheet 1

*Inventor*
Christianus M. T. Westelaken
Stevens, Davis, Miller & Mosher
Attorneys

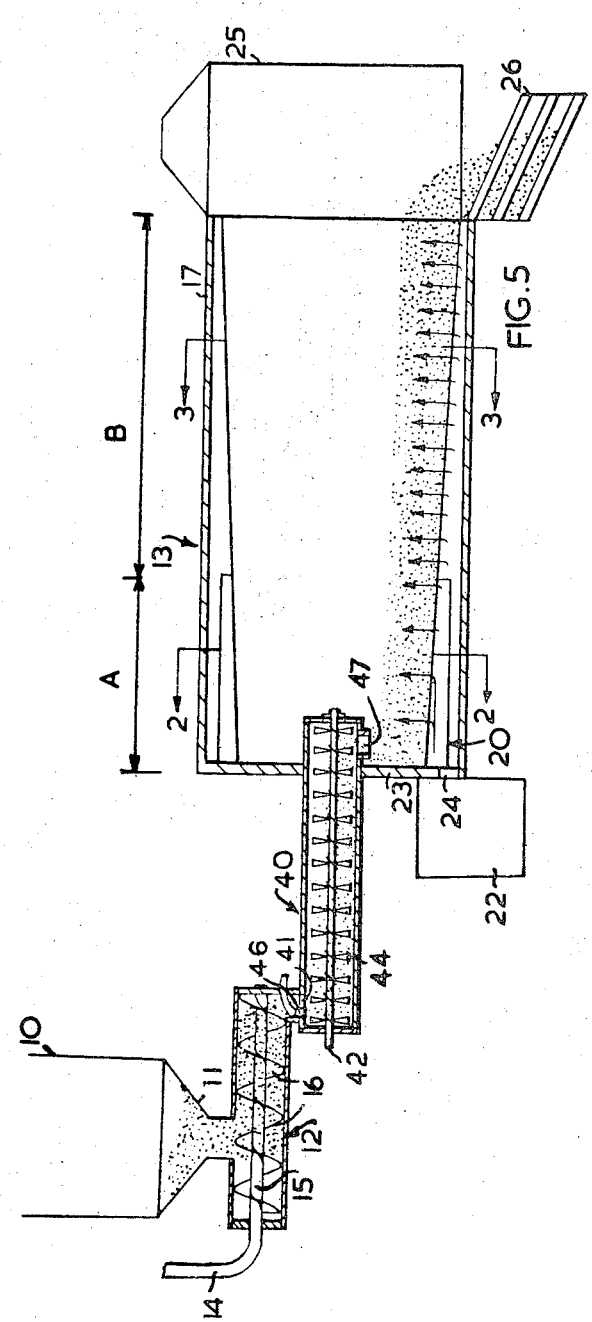

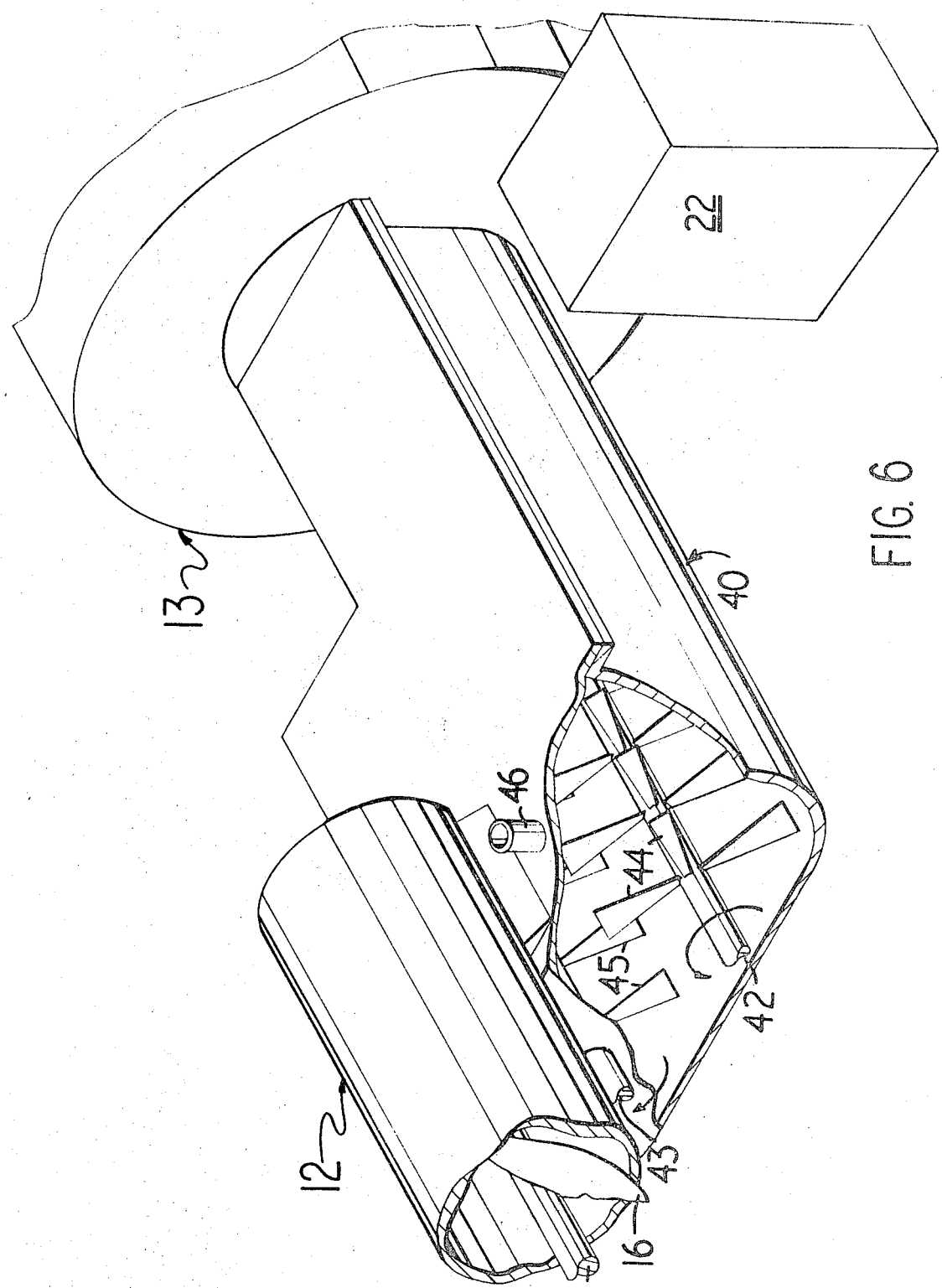

United States Patent Office 3,547,612
Patented Dec. 15, 1970

3,547,612
PRODUCTION OF GRANULAR FERTILIZERS
Christianus M. T. Westelaken, 190 North St.,
Strathroy, Ontario, Canada
Filed Feb. 21, 1966, Ser. No. 528,716
Int. Cl. C05f 3/00
U.S. Cl. 71—21                                    8 Claims

ABSTRACT OF THE DISCLOSURE

A process for the production of granular fertilizer from poultry manure wherein moistened, finely divided manure is granulated and dried in a two stage rotary kiln under the action of a drying gas.

---

Figure 1:
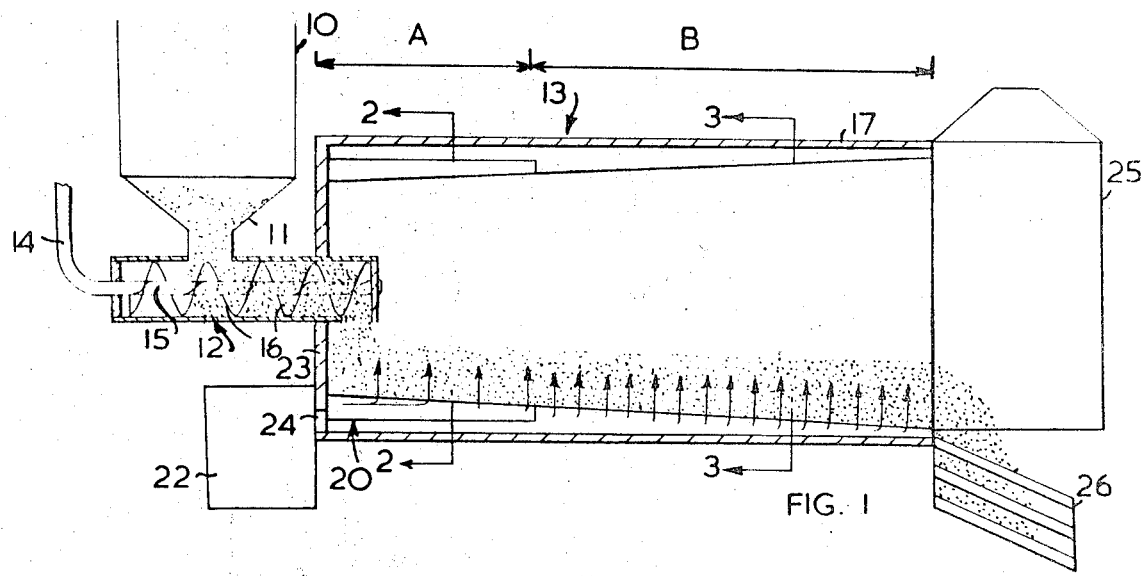

This invention relates to the production of materials in granular form and in particular to materials suitable for use as fertilizers in granular form. The basic fertilizer materials intended for use in the present invention are the natural organic fertilizers such as manures and more specifically poultry manures rather than the chemical type of fertilizers such as nitrates, sulphates and phosphates.

Prior to this invention the natural organic fertilizers have not received the ready acceptance which is due this valuable material. This has been, to a large part, a fault of the poor form in which these types of fertilizers have been marketed.

Poultry droppings and other manures are usually collected with straw, or other liquid absorbent materials known as litter, to conserve the fluids in the droppings. The collected composite droppings and litter, is then dried, comminuted or ground to a pulverized finely divided material and bagged without further treatment. During shipping and storage, this ground product tends to pack down and must be broken up prior to use. The fertilizer product in this form has met with little success as the particles in finely divided form creates a dust problem during use and the strong odour which emanates from the product is very objectionable.

Attempts have been made to prepare organic manures in a more acceptable form for marketing purposes. In one such attempt, the finely divided material with additives was passed through an extrusion die and the extruded strand comminuted to pellet size. Although the product obtained is a great improvement over the prior practice, the process has been found to be both expensive and time consuming.

Fertilizer materials in granular form are well known in the art and consist generally of various intimate admixtures of ammonium salts such as the sulphates and nitrates, phosphates and superphosphates, potassium salts, etc. These materials may be in finely divided form and with the addition of other materials may be formed with the aid of binders or moisture to proper sized spheroids or granules.

Such has not been the case with the natural or organic fertilizers as granules of this type of material are not readily formed and prior attempts to granulate this type of material has resulted in a lumpy unsized hard product.

Thus, a broad feature of the present invention is the provision of a novel process for converting a finely divided solid organic material into granules of a desired size.

A further feature of the present invention is the provision of a novel process for the production of organic fertilizer materials in granular form.

An additional feature of the present invention is the provision of, as a novel composition of matter, an organic fertilizer in granular form.

A still further feature of the present invention is the provision of an organic fertilizer of specific composition in granular form.

A further feature of the present invention is the provision of a novel form of apparatus which can be employed for the granulation of materials such as fertilizers.

Figure 2:
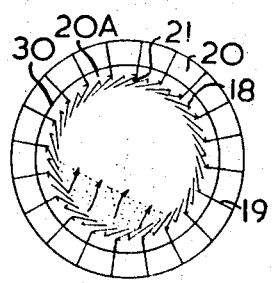
Figure 3:
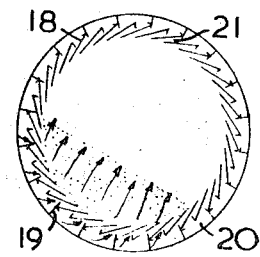
Figure 4:
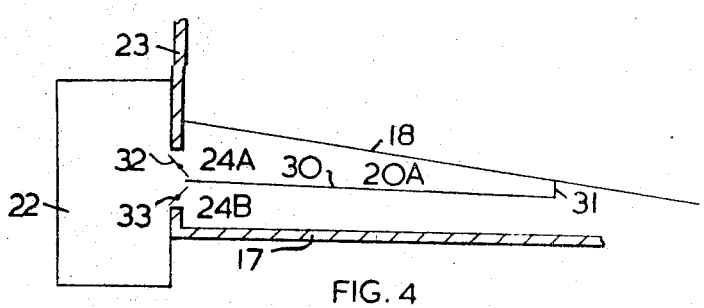

Other objects and advantageous features will be apparent from the following detailed description and drawings wherein:

FIG. 1 is a schematic side elevation of an apparatus for use in the manufacture of granular fertilizer materials, FIG. 2 is a cross-section of the apparatus taken along the line 2—2 in FIG. 1, FIG. 3 is another cross-section of the apparatus taken along the line 3—3 in FIG. 1, FIG. 4 is an enlarged sectionalized view of the apparatus of FIG. 1 showing the gas distribution, FIG. 5 is a schematic side elevation of an alternative form of the apparatus, and FIG. 6 is an enlarged sectional view partially broken away of the preferred means for introducing the feed to the granulating means.

It should be noted at this point that the term "organic" employed in conjunction with organic materials and organic fertilizers used throughout the disclosure and the appended claims denotes manures such as the natural droppings from poultry rather than organic as used in the chemical sense.

The finely divided organic materials suitable for granulation in accordance with the process of the present invention may be prepared in the following manner. The manure or droppings are allowed to fall on litter, usually straw, placed there for that purpose. The litter absorbs the fluids in the manure and slows the escape of valuable properties therefrom. The mixture of manure and litter is collected periodically and placed on a conveyor or pans and passed through a heated chamber to dehydrate the mixture. This dehydrated mixture is then fed to a hammer mill or other similar type of apparatus where the litter and any lumps are comminuted. The discharge from the mill may be screened with any coarse or unbroken material being recycled through the mill.

Chemicals may be added to the finely divided material passing the screen at the discharge end of the mill to provide additional nutrients to the fertilizer product. I have found that with the addition of about 1% urea, about 1% phosphate and about ½% potash to the finely divided material prior to granulation provides a fertilizer product having a total of about 7% nitrogen, about 3% $P_2O_5$ and about 3% $K_2O$, which in the nomenclature of the fertilizer field may be called 7-3-3. I have found that this particular combination, 7-3-3, provides the fine grasses usually found on lawns and particularly golf course greens with the proper balance of nutrients to stimulate growth and to maintain the plants in a healthy, excellent looking condition. This particular combination appears to have a superior effect on these fine type of grasses from the other known types of fertilizers commonly employed.

The finely divided material, with or without chemical additives, may be conveyed to a bulk storage bin or prepared for granulation.

Referring to the drawings, which schematically illustrates the apparatus which may be used in the process of this invention, the finely divided materials are placed in feed hopper 10. These materials are discharged through the conical bottom 11 of the hopper by a screw conveyor 12 into a revolving drum generally indicated at 13.

The screw conveyor 12 has any well known drive means, not shown, and includes a steam supply line 14 attached to rotating shaft 15 in a conventional manner.

The flights 16 of the screw or auger have steam vents or ports which allows the steam to permeate the material being conveyed. In this manner, sufficient moisture is added to prepare the finely divided material for granulating while at the same time pre-heating the material entering the drum.

The drum, indicated at 13, has a conventional drive mechanism, not shown, for rotation about the longitudinal axis through the center thereof. The drum 13 is composed of an outer shell 17 with a series of ribs or louvres 18 running lengthwise of the drum and supported interiorly within the drum by support braces 19. The louvres or ribs 18 overlap each other to form a chamber indicated at 20 between the louvres 18 and the shell 17. The louvres 18 are so positioned that they do not touch one another but leave a space 21 between each louvre. The braces 19 may be so constructed as to be shorter in length towards the discharge end of the drum thus the chamber 20 tapers gradually towards that end.

The finely divided moistened material entering the drum 13 by the screw conveyor 12 is supported by the louvres 18 above the chamber 20. As the drum is rotated the material is gently agitated and rolls upon itself and due to the taper of chamber 20 is continuously advanced through the drum to the discharge end.

As shown in FIG. 4 chamber 20 is sectioned as to provide a partial enclosure 20A formed by the partition 30 and end wall 31 of the enclosure. The partition 30 is supported by the braces 19 with end wall 31 being attachedly affixed to the louvres. The enclosure 20A is so constructed as to extend about one third of the overall length of the drum 13.

Heater inlet, schematically shown at 22 is attached to the end wall 23 of drum 13 in sliding contact therewith. A pre-heater with blower, not shown, supplies heated gases to the inlet 22 which enter the chamber 20 through the opening generally indicated at 24 in the end wall 23 of the drum. The partition 30 extends partially through the opening in the end wall 23 dividing the opening 24 into two inlets 24A and 24B. The flow of the heated gases through inlet 24A and into the enclosure 20A is controlled by a valve indicated at 32 and the flow of heated gases through inlet 24B into the chamber 20 is controlled by a valve indicated at 33.

The heated gases entering chamber 20 and 20A flow through space 21 of the louvres 18 and permeate the material within the drum. The gases which act to dry and heat the finely divided material within the drum may be exhausted through a cyclone indicated at 25. Any fines which are entrapped with the exhaust gases are separated in the cyclone 25 and may be united with the material being discharged from the drum 13 or these fines may be recycled directly to the feed end of the system.

I have found that in order to obtain efficient and optimum granulation of the finely divided organic material, particularly pulverized poultry composite, the flow of heated gases must be controlled so that a much greater flow permeates the material in the latter portion of the drum 13 indicated by the area B than in the front portion of the drum indicated by the area A. This controlled flow in effect allows the material entering the feed end of the drum 13 to be more gradually brought to the optimum temperature for granulating purposes. If the material on entering the drum 13 is subjected to too high a temperature in the area A the material tends to cake and lump resulting in an unsized product. The flow of the gases is controlled by the valves 32 and 33 thus allowing a restricted flow through the chamber 20A in area A. This is schematically shown in the drawing wherein the arrows represent the volume of the heated gases. As indicated in FIG. 2, taken in area A, fewer arrows permeate the material in comparison to the number of arrows permeating the material in FIG. 3, taken in area B.

Nuclei of the moistened finely divided poultry composite material form in the material on first entering the drum 13. These nuclei are fairly rapidly enlarged by picking up other material, due to the rotation of the drum, and form granules. The heated gases which are introduced from the enclosure 20A pass through the spaces 21 formed by the louvres 18 and permeate the material to remove sufficient moisture to prevent agglomeration of the newly formed granules. The control of the flow of heated gases to enclosure 20A in the area A of the drum is fairly critical. If too large a volume is used, it would in effect dry the material rapidly thus preventing a build up on the nuclei and resulting in an undersized fine product. In the event that not a large enough volume is supplied at this point the granules which have formed tend to agglomerate and produce an unsized lumpy product. The volume of gases entering enclosure 20A through opening 24A may be controlled by a butterfly valve 32.

The material, now in granular form, is advanced into area B of the drum 13. In this area, the material is subjected to a greater volume flow of heated gases which in effect raises the bed of the material to a higher temperature. The granules are further dried and baked to increase their crush resistance. The hardened granules in a relatively dry state may be discharged by a conventional flute or scoop means, not shown, or by merely overflowing from the drum.

The material is discharged from the drum 13 onto a vibratory screening system indicated at 26 whereby any lumpy or coarse material which is removed may be comminuted and passed through the granulating apparatus again. The fine particles which pass through an intermediate screen may be recycled to the feed end of the system. The granules in the range of about $\frac{1}{16}''$ to $\frac{1}{8}''$ diameter, are discharged from the intermediate screen.

In a preferred alternative form of the apparatus as shown in FIG. 5 and FIG. 6, wherein like numbers represent like parts as previously described, the material conveyed from the hopper 10 by the screw conveyor 12 may be discharged into a paddle mixer indicated generally at 40 through opening 41. The paddle mixer, as shown in FIG. 6, is enclosed in a housing containing two side by side rotatable shafts, shaft 42, rotating in a counter clockwise manner and shaft 43, rotating in a clock-wise manner. The shafts 42 and 43 may be driven by any known type of driving mechanism, not shown. Extending generally perpendicularly from shaft 42 are paddles 44 angled to promote advancement of the material. In a similar fashion, paddles 45 extend from shaft 43.

The overall housing, as shown in FIG. 6 enclosing the two paddle shafts, is so designed that the housing of shaft 42 extends beyond that portion housing shaft 43 and in this manner shaft 43 is about one-half the length of shaft 42. As shown, the portion of the housing of shaft 42 extends into the central opening of the rotating drum 13.

The material discharged through opening 41 from the screw conveyor 12 comes into contact with the paddles 45 on shaft 43 rotating in a clock-wise manner. Shaft 42 with paddles 44 rotates in a counter clock-wise manner which causes intimate mixing of the material while at the same time conveying the material along the length of the mixer. Inlet 46 terminating interiorly in a spray nozzle, not shown, introduces moisture in the form of steam or water into the material. The paddles act to thoroughly distribute the moisture introduced throughout the material to form a homogeneous mixture for feed to the drum 13. Although only one inlet has been indicated for introducing moisture to the mixer, a plurality of such inlet spaced along the top of the mixer may be employed. The material is advanced by the rotation of the paddles and discharges through outlet 47 into the rotating drum 13.

As stated previously, FIG. 5 is a preferred alternative form of the apparatus and I do not wish to be restricted to any particular feeding means, however I feel that the paddle mixer assists greatly in the formation of nuclei in the material as the material appears to form granules more readily when passed through this type of equipment.

The apparatus as shown in the drawings and described hereinabove specifies that the chamber 20 formed between the shell 17 and the louvres 18 may taper towards the discharge end as a result of the length of the support braces 19 employed. I do not wish to be restricted to only this form as modification can readily be made to the apparatus. For example, when all of the braces 19 are of the same length, the area created between the shell 17 and the louvres 18 is then substantially the same width throughout the entire length of the drum. The material may be advanced through the drum 13 by merely sloping the drum towards the discharge end. By a further modification, the louvres 18 may be so positioned lengthwise in the drum as to form a spiral which would promote advancement of the material through the drum thus obviating the need for sloping the drum towards the discharge end.

In operation, the dehydrated pulverized poultry composite has been found to retain about 5% moisture. To prepare this material for granulation additional moisture must be added. This additional moisture may be incorporated into the material as indicated in FIG. 1 via steam vents on the flights of the screw conveyor. Optionally the material may be passed through a paddle mixer as shown in FIGS. 5 and 6 having steam or water spray nozzles and the material thoroughly dampened during the mixing operation. As there are several ways in which the moisture may be added, it is sufficient only to state that about 25% additional moisture is incorporated into the pulverized material.

During operation, the gas permeating the material in area A of drum 13 should produce an ambient temperature of about 250° F. In order to accomplish this, the flow rate of the gas entering area A through the louvers at 500° F. is appropriately adjusted by means of valve 32 at opening 24A. As the temperature of the material passes through the range of about 185° F. to about 200° F., optimum granulation thereof occurs. The granules formed under these conditions have a diameter of about 1/16" to about 1/8".

The so-granulated material is then charged into area B, wherein the flow rate of 500° F. gas passing through the louvers is adjusted to a great enough extent by means of valve 33 at opening 24B to produce an ambient temperature of about 500° F. therein. Under these conditions, the granules discharged from the drum 13 have a residual moisture content of about 2%.

The gases employed in the process may be heated air or any other gases which do not have an adverse effect on the material being treated.

The poultry manure granules obtained have about 7% N, about 3% $P_2O_5$ and about 3% $K_2O$ which has been found to be an ideal organic fertilizer for lawn grasses. The granules have been found to be relatively tough and do not disintegrate with handling and storage but remain separate and free flowable entities. Poultry fertilizer in this form may be readily applied through any type of feeder mechanism and the objectionable odor usually associated with this type of fertilizer is, to a great extent, eliminated. The granules are readily absorbed into the ground under the influence of rain or water acting as moisture holders and soil conditioners for the grass as well as supplying the desired nutrients for healthy plant growth.

I claim:

1. A process for the production of granular fertilizer comprising: charging moistened finely divided poultry manure solids into a first heating zone; rotating said solids in said zone; passing a heated gas through said solids, the flow rate and initial temperature of said gas, and the charging rate and initial temperature of said solids being so adjusted as to create an ambient temperature of about 250° F. in said first heating zone, the temperature of said solids passing through a range of about 185–200° F. so that said solids are formed into granules; charging said granules into a second heating zone; rotating said granules in said second zone; passing a heated gas through said granules, the flow rate and initial temperature of said gas and the charging rate and initial temperature of said granules being so adjusted as to create an ambient temperature of about 500° F. in said second heating zone, so that said granules are dried and strengthened; and discharging the so-dried and strengthened granules from said second zone.

2. The process of claim 1, wherein about 25% additional moisture is incorporated into said solids prior to the charging thereof into said first heating zone.

3. The process of claim 1, wherein said solids are moistened with steam prior to being charged into said first heating zone.

4. The process of claim 1, wherein said solids are moistened with water prior to being charged into said first heating zone.

5. The process of claim 2, wherein said first heating zone and said second heating zone are included in a single rotating chamber.

6. The process of claim 1, wherein said poultry solids are charged continuously into said first heating zone and said granules are charged continuously into said second heating zone.

7. The process of claim 1, wherein said gas passed through said first and second zones is air.

8. The process of claim 1, further comprising the step of mixing small amounts of conventional fertilizer nutrients with said poultry solids prior to the charging thereof into said first heating zone.

References Cited

UNITED STATES PATENTS 3,050,383   8/1962   Wilson   71—64(D)X

REUBEN FRIEDMAN, Primary Examiner

R. BARNES, Assistant Examiner

U.S. Cl. X.R.

71—64